(12) United States Patent
Lin et al.

(10) Patent No.: US 7,511,794 B2
(45) Date of Patent: Mar. 31, 2009

(54) LIQUID CRYSTAL DISPLAY SUBSTRATE AND FABRICATION METHOD THEREOF

(75) Inventors: Ming-Tien Lin, Lujhou (TW); Tean-Sen Jen, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 24 days.

(21) Appl. No.: 10/995,635

(22) Filed: Nov. 22, 2004

(65) Prior Publication Data

US 2005/0157245 A1 Jul. 21, 2005

(30) Foreign Application Priority Data

Jan. 16, 2004 (TW) .............................. 93101150 A (51) Int. Cl.
*G02F 1/1339* (2006.01)
(52) U.S. Cl. ..................................... 349/156
(58) Field of Classification Search ................ 349/155, 349/156
See application file for complete search history.

(56) References Cited

U.S. PATENT DOCUMENTS

| 6,337,730 B1 * | 1/2002 | Ozaki et al. | 349/156 |
| 6,671,025 B1 * | 12/2003 | Ikeda et al. | 349/156 |
| 2002/0075443 A1 | 6/2002 | Shimizu et al. | 349/155 |

* cited by examiner

*Primary Examiner*—James A Dudek
(74) *Attorney, Agent, or Firm*—Thomas, Kayden, Horstemeyer & Risley (57) ABSTRACT

A liquid crystal display (LCD) substrate and a fabrication method thereof are provided. The LCD substrate comprises a substrate, a spacer definition layer formed on the substrate comprising a first step, and a spacer formed along a profile of the first step of spacer definition layer and adjacent to the first step, thereby forming a second step on the spacer. The invention utilizes a single photolithographic process to form spacers with steps, thus, effectively lowering the probability of mura defects caused by gravity, contact, or an uneven cell gap.

10 Claims, 13 Drawing Sheets

LIQUID CRYSTAL DISPLAY SUBSTRATE AND FABRICATION METHOD THEREOF

BACKGROUND

The invention relates to a liquid crystal display (LCD) substrate, and more particularly, to a LCD substrate having spacers with steps and a fabrication method thereof using a photolithographic process.

Liquid crystal displays (LCDs) typically comprise a pair of opposing substrates and a liquid crystal layer interposed therebetween. And a plurality of photo spacers is defined the distance between the opposing substrates. (i.e., cell gap). In order to extend the category of the LCD application, the cell gap of the LCD shall be shrunk and cell gap uniformity control will be a key issue in manufacturing. An uneven cell gap may cause luminance variation over a line or a region of the LCD panel, hereinafter referred to as mura defects.

Mura defects are related to the density of photo spacers or contact areas of the substrate with photo spacers. When external force temporarily applied, such as finger wiping, the photo spacers are deformed, causing photo spacer deviation. However, as the density of the photo spacer is large, the friction force increases. The spacer deviation cannot recover even if force removed, thereby causing a wipe mura defect.

If the density of the spacers decreases to ameliorate the wipe mura defect, other problems will occur. For example, when normal force is exerted on the substrate, the spacer deforms. When the density of the photo spacer is reduced, however, the support provided thereby is insufficient to withstand the force such that deformation cannot recover even if the force is removed, resulting in a push mura defect.

U.S. Patent. No. 2002/0075443, the entity of which is fully incorporated by reference herein, Shimizu et al. disclose two different height column-shaped spacers to solve the aforementioned problems.

Figure 1:
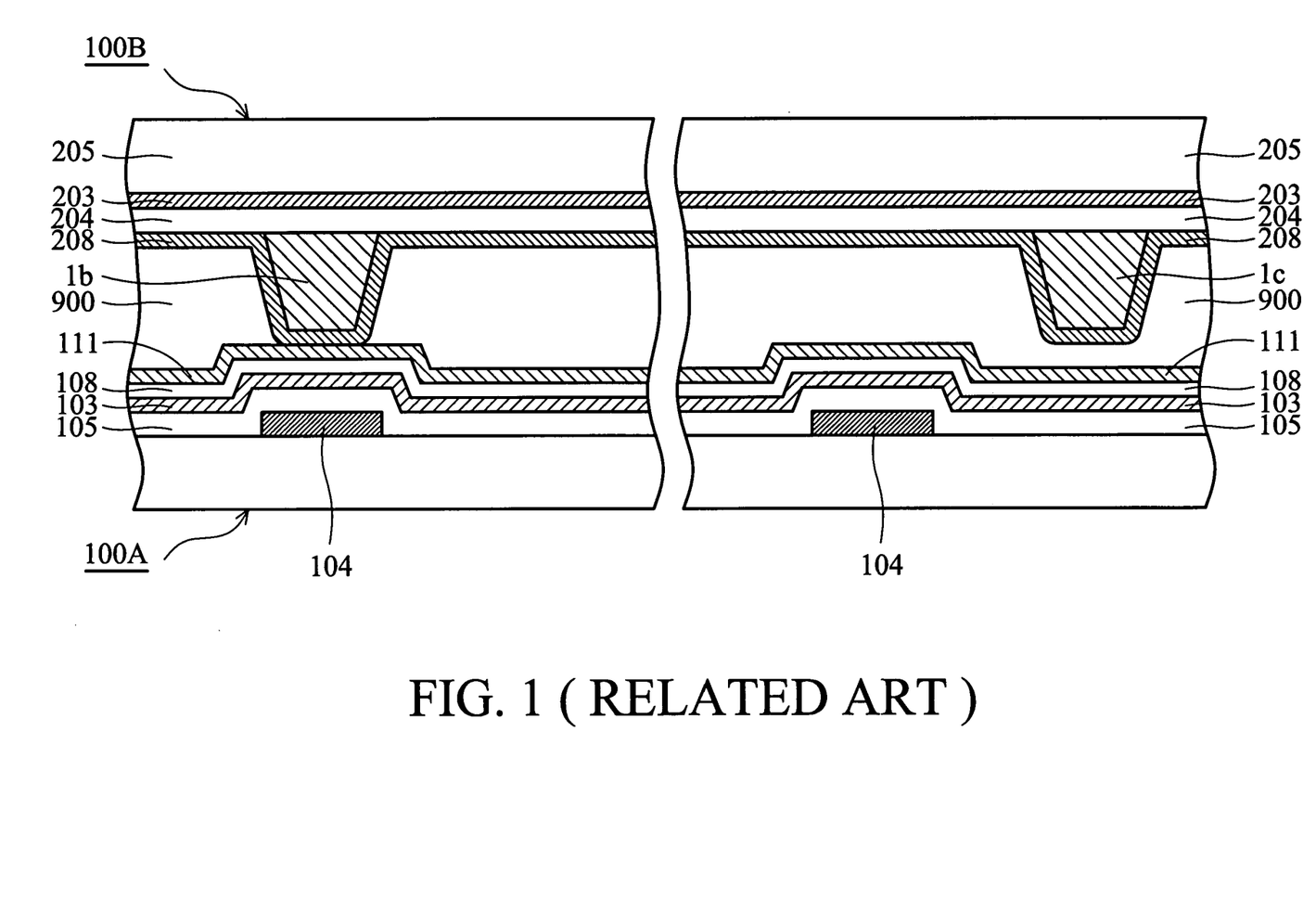
FIG. 1 is a cross section illustrating two different height column-shaped spacers on the color filter substrate.

Two different height column-shaped spacers are formed on the color filter substrate. One spacer contacts the TFT substrate, while the other does not. FIG. 1 is a cross section illustrating two different height column-shaped spacers on the color filter substrate. A TFT substrate 100A comprises signal lines 103 and 104, an insulating layer 150, a passivation layer 108, and an alignment layer 111 thereon. A color filter substrate 100B comprises a substrate 205, a black matrix (BM) 203, a passivation layer 204, spacers 1b and 1c, and an alignment layer 208. A liquid crystal layer 900 is interposed between the TFT substrate 100A and the color filter substrate 100B.

Spacer 1b disposed on the signal line 104 contacts the TFT substrate 100A, thereby creating a specific gap between the TFT substrate 100A and the color filter substrate 100B. The spacer 1c is not disposed on the signal line 104 and often kept a small distance away from the TFT substrate 100A. When a normal force is applied on the LCD substrate, the spacer 1b can be elastically deformed while the spacer 1c can contact the TFT substrate 100A. The entire density of the spacer increases such that more load can be sustained, thereby preventing push mura defects.

Figure 2:
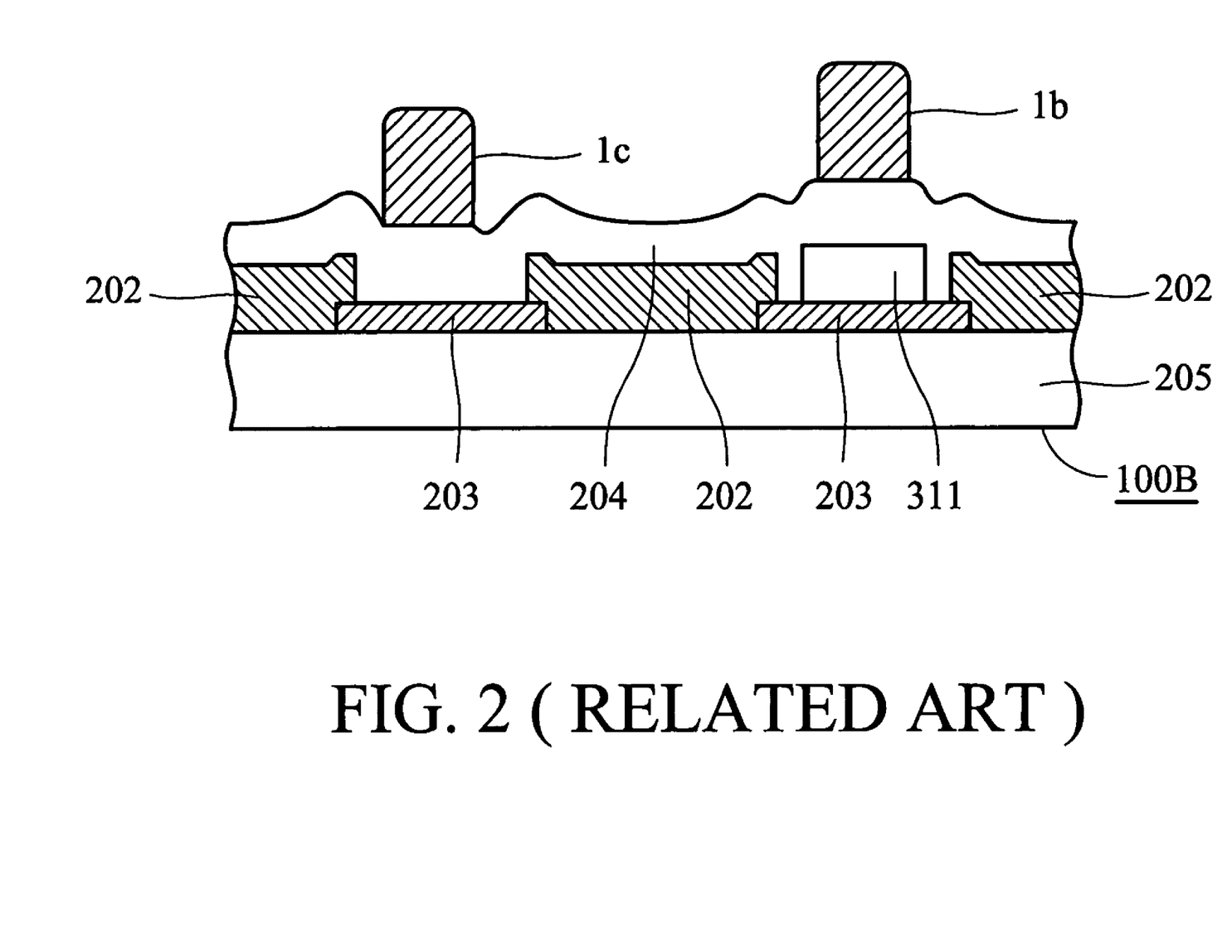
FIG. 2 shows a cross section illustrating another embodiment of two different height column-shaped spacers according to the related art.

FIG. 2 is a cross section illustrating another embodiment of two different height column-shaped spacers according to U.S. Patent. No. 2002/0075443. Only a portion of the color filter substrate 100B is shown for the sake of simplicity. Numeral 205 denotes a substrate, 202 denotes a color filter, 203 denotes a black matrix (BM), 204 denotes a passivation layer, and 311 denotes a base pattern. The spacer 1b is disposed on the base pattern 311. Similarly, the spacer 1b contacts the TFT substrate (not shown), while the spacer 1c is kept a small distance from the TFT substrate. When a normal force is applied on the LCD substrate, the spacer 1b can be elastically deformed while the spacer 1c can contact the TFT substrate. The entire density of the spacer increases such that more load can be sustained, thereby preventing push mura defects.

Figure 3A:
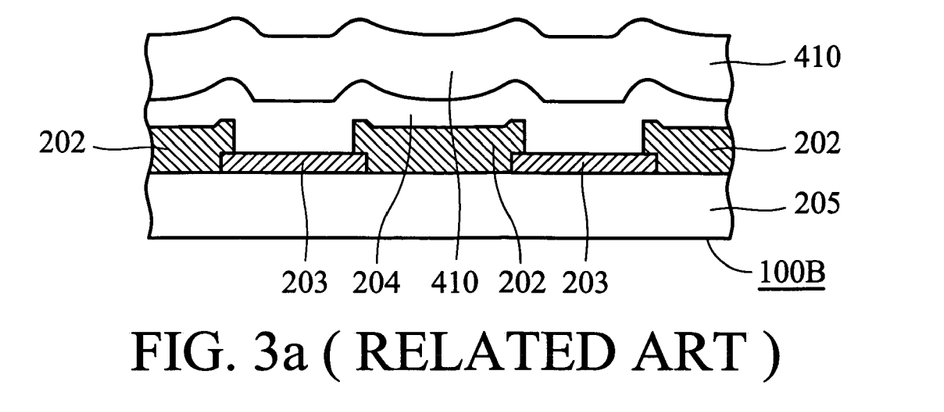
FIGS. 3a-3c schematically illustrate procedures for manufacturing a spacer with a step.
Figure 3B:
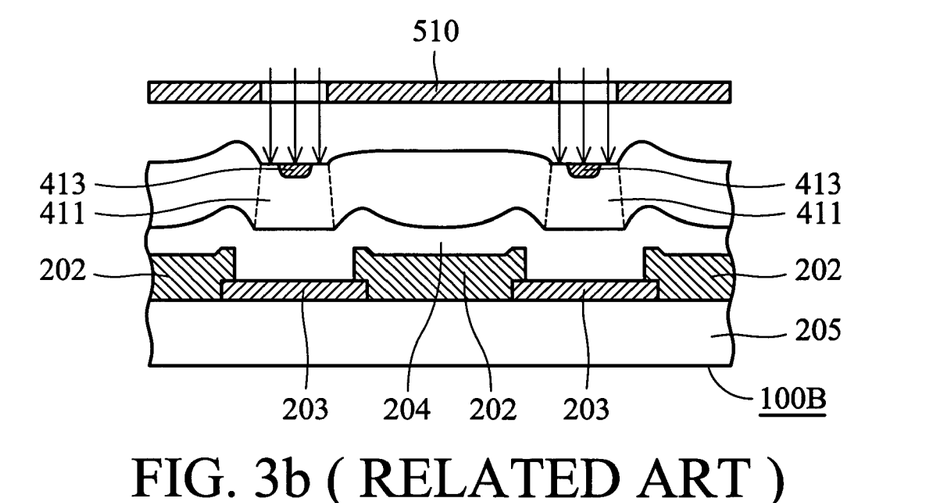
Figure 3C:
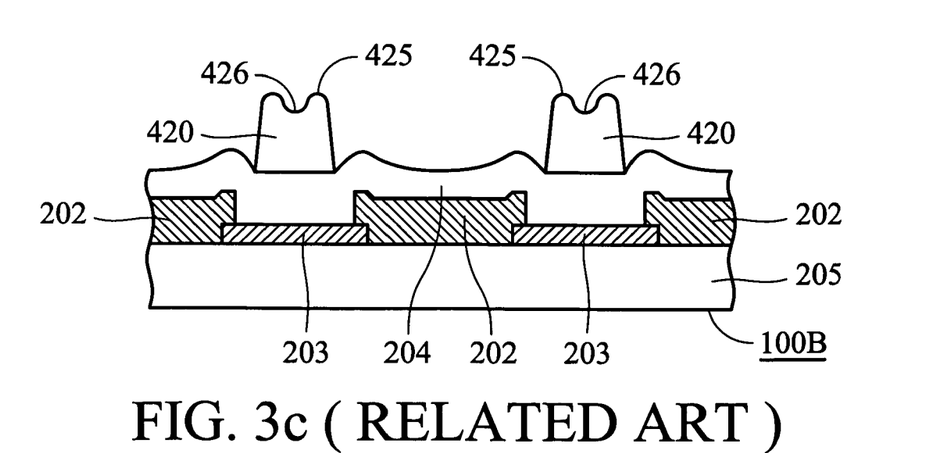

Shimizu et al. also disclose a spacer with a step on top of the spacers capable of preventing push mura defects. A spacer with a step is formed on the color filter substrate. The step on the spacer partially contacts the TFT substrate. FIGS. 3a-3c schematically depict procedures for manufacturing the spacer with a step. Referring FIG. 3a, a black matrix 203 and a color filter 202 are sequentially formed on the substrate 205. A passivation layer 204 is formed on the substrate 205 covering the black matrix 203 and the color filter 202. A photoresist layer 410 is formed on the passivation layer 204.

Referring to FIG. 3b, the photoresist layer is lithographically exposed using a half-tone mask 510. The center region 413 is exposed to a higher dosage than the peripheral region 411, thus forming a spacer 420 with a step comprising a protrusion 425 and a recess 426, as shown in FIG. 3c.

Figure 4A:
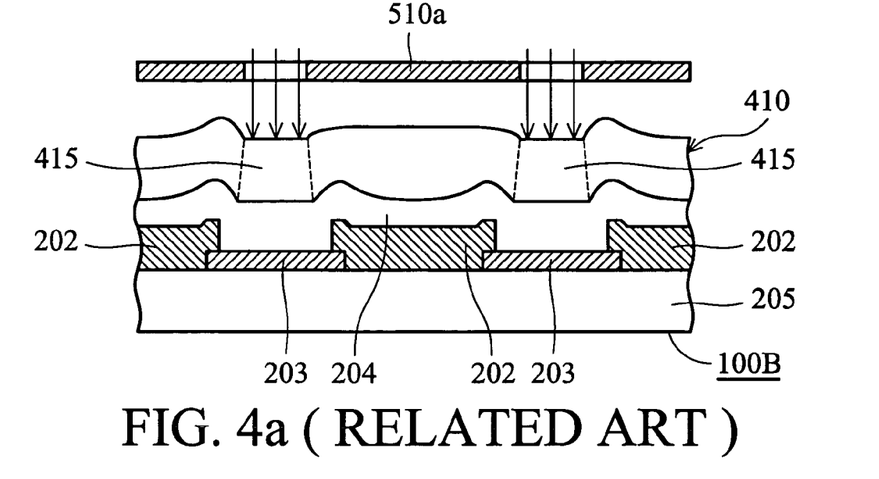
FIGS. 4a-4c schematically illustrate other procedures for manufacturing a spacer with a step using dual exposure steps to form the spacer.
Figure 4B:
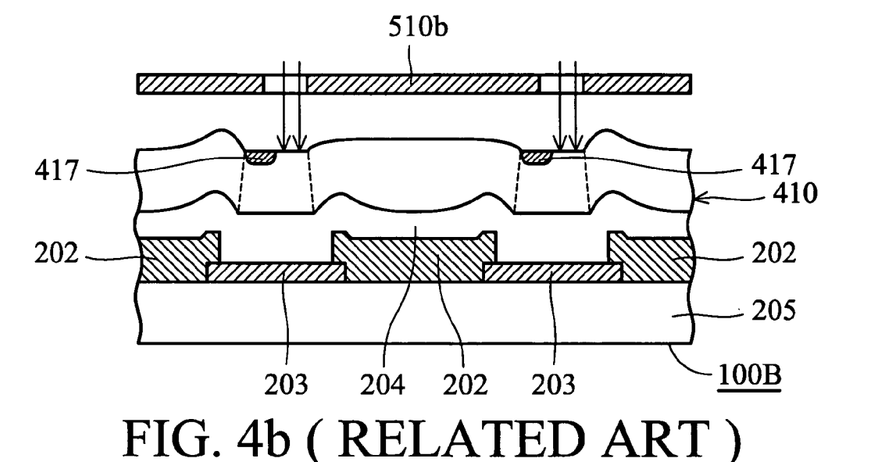
Figure 4C:
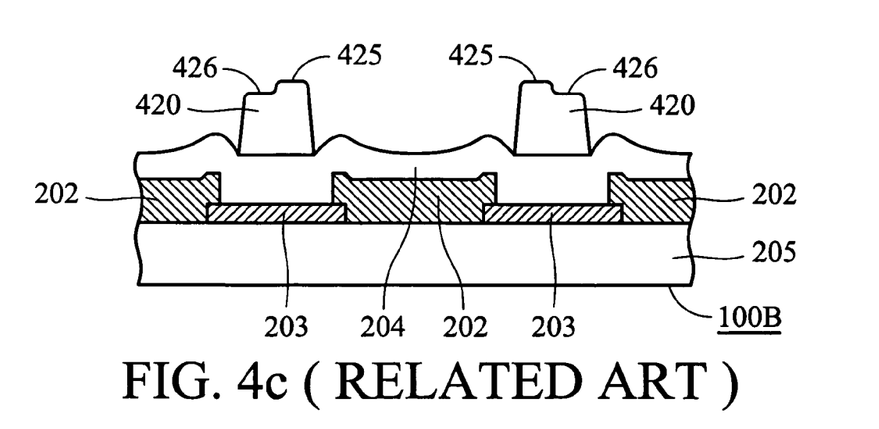

FIGS. 4a-4c schematically depict other procedures for manufacturing the spacer with a step using dual exposure steps. Referring FIG. 4a, a black matrix 203 and a color filter 202 are sequentially formed on the substrate 205. A passivation layer 204 is formed on the substrate 205 covering the black matrix 203 and the color filter 202. A photoresist layer 410 is formed on the passivation layer 204. A portion 415 of the photoresist layer 410 is exposed using a mask 510.

Referring to FIG. 4b, the photoresist layer 410 is then exposed using a second mask 510b with a smaller exposed region such that a portion 417 of the photoresist layer 410 is shielded. The region 415 is exposed to a higher dosage than the region 417, thus forming a spacer 420 with a step comprising a protrusion 425 and a recess 426, as shown in FIG. 4c.

According to the spacers with a step as disclosed in both FIGS. 3a-3c and FIGS. 4a-4c, the protrusion 425 contacts the TFT substrate, while the recess 426 does not. When a normal force is applied on the LCD substrate, the protrusion 425 can be elastically deformed while the recess 426 can contact the TFT substrate. The entire density of the spacer increases such that more load can be sustained, thereby preventing push mura defects.

The conventional methods of forming spacers with a step require half-tone exposure or dual exposure steps, thereby creating technical hurdles, process complexity, and cost barriers.

SUMMARY

Embodiments of the invention substantially overcome the disadvantages associated with the related art and achieve other advantages not realized by the related art.

Embodiments of the invention provide a LCD substrate comprising a structure having a first step. A spacer with a second step can be formed on the first step. Consequently, only one photo mask step is required to form a spacer with a step and is simpler than the conventional half-tone masking method.

One aspect of the invention is directed to a LCD substrate comprising a substrate, a spacer definition layer formed on the substrate comprising a first step, and a spacer formed along a profile of the first step adjacent to the first step, thereby forming a second step on the photo spacer. It is noted that the spacer definition layer comprises a light shield array or a color filter.

Another aspect of the invention is directed to a method for fabricating a LCD substrate comprising forming a spacer definition layer on a substrate having a first step, forming a spacer layer on the spacer definition layer, thereby forming a second step along a profile of the first step on the spacer layer, and defining the spacer layer into a spacer by a lithographic development step remaining from the second step.

In accordance with a first embodiment of the invention, a LCD substrate comprises a substrate, a light shield array formed on the substrate comprising a first opening and a second opening, thereby the first opening defines an active region and the second opening defines a first step, a color filter formed on the active region of the substrate, and a spacer formed along a profile of the first step adjacent to the first step, thereby forming a second step on the photo spacer.

The fabrication method for the LCD substrate in accordance with the first embodiment comprises forming a light shield array on a substrate comprising a first opening and a second opening, thereby the first opening defines an active region and the second opening defines a first step, forming a color filter in the active region, forming a spacer layer on the light shield array, thereby forming a second step along a profile of the first step, and defining the spacer layer into a spacer with the forgoing second step by a lithographic process.

In accordance with a second embodiment of the invention, a LCD substrate comprises a substrate, a light shield array formed on the substrate comprising a first opening defining an active region, a color filter formed in the active region of the substrate having an edge defining a first step, and a spacer formed along a profile of the first step adjacent to the first step, thereby forming a second step on the spacer.

The fabrication method for the LCD substrate in accordance with the second embodiment comprises forming a light shield array on a substrate comprising a first opening defining an active region, forming a color filter in the active region of the substrate having an edge defining a first step, forming a pacer layer on the color filter, thereby forming a second step along a profile of the first step, and defining the spacer layer into a spacer by a lithographic development step remaining from the second step.

In accordance with a third embodiment of the invention, a LCD substrate comprises a substrate, a light shield array formed on the substrate comprising a first opening defining an active region, a color filter formed in the active region and non-active region of the substrate, wherein the color filter comprises a third opening defining a first step in the non-active region, and a spacer formed along a profile of the first step adjacent to the first step, thereby forming a second step on the spacer.

The fabrication method for the LCD substrate in accordance with the third embodiment comprises forming a light shield array on a substrate comprising a first opening defining an active region, forming a color filter in the active region of the substrate, wherein the color filter comprises a third opening defining a first step in the non-active region, forming a spacer layer on the color filter, thereby forming a second step along a profile of the first step, and defining the spacer layer into a spacer with the forgoing second step by a lithographic process.

In accordance with a fourth embodiment of the invention, a LCD substrate comprises a substrate, a light shield array formed on the substrate comprising a first opening defining an active region, a color filter formed in the active region and non-active region of the substrate, and a first spacer and second spacer, wherein the first spacer is formed in the region without color filter, and the second spacer is formed in the non-active region with color filter, wherein a height difference is between the first spacer and the second spacer.

Embodiments of the invention additionally provide a liquid crystal display comprising a first substrate, a second substrate, a liquid crystal layer interposed between the first substrate and the second substrate, wherein a spacer definition layer formed on the first or the second substrate having a first step, a plurality of spacers formed along a profile of the first step adjacent to the first step, thereby forming a second step on the spacer.

BRIEF DESCRIPTION OF THE DRAWINGS

Embodiments of the invention can be more fully understood by reading the subsequent detailed description in conjunction with the examples and references made to the accompanying drawings, wherein:

FIG. 7b is a cross section taken along line 7b-7b of FIG. 7a;

FIG. 9b is a cross section taken along line 9b-9b in FIG. 9a;

FIG. 10b is a cross section taken along line 10b-10b in FIG. 10a;

FIG. 11b is a cross section taken along line 11b-11b in FIG. 11a; and

DETAILED DESCRIPTION

Reference will now be made in detail to embodiments of the invention, examples of which are illustrated in the accompanying drawings.

Figure 5:
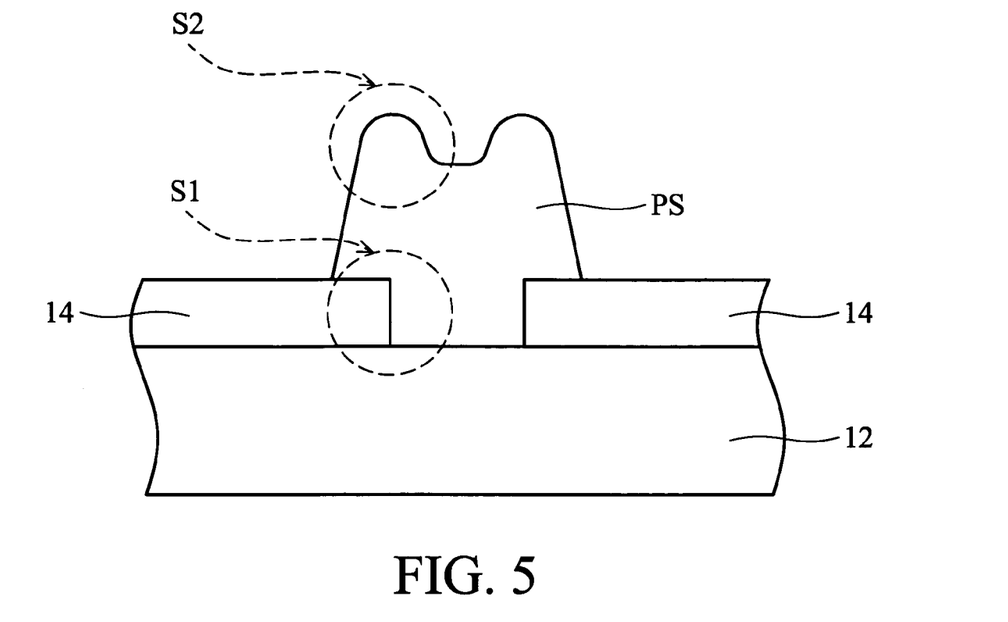
FIG. 5 is a cross section illustrating a LCD substrate according to one aspect of the invention.

FIG. 5 is a cross section illustrating a LCD substrate according to one aspect of the invention. The LCD substrate comprises a substrate 12, a spacer definition layer 14 formed on the substrate 12, a photo spacer PS formed on the spacer definition layer 14. The spacer definition layer 14 comprises an opening with a first step S1 along the opening. The photo spacer PS is formed along the profile of the first step S1 on the spacer definition layer 14 adjacent to the first step S1, thereby forming a second step S2 on the photo spacer PS.

Figure 6:
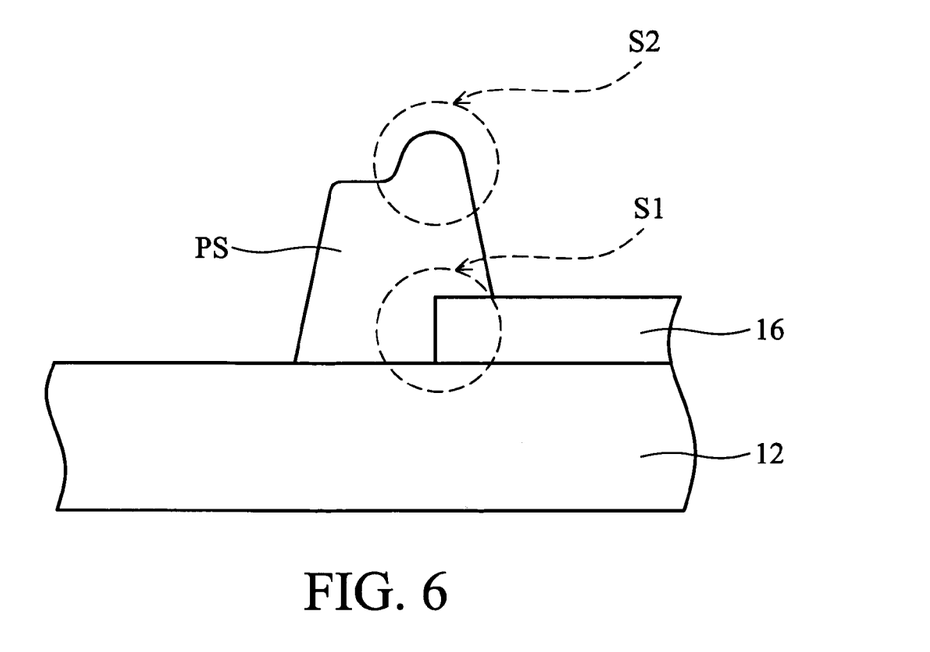
FIG. 6 is a cross section illustrating a LCD substrate according to another aspect of the invention.

FIG. 6 is a cross section illustrating a LCD substrate according to another aspect of the invention. The LCD substrate comprises a substrate 12, a spacer definition layer 16 formed on the substrate 12, a photo spacer PS formed on the spacer definition layer 16. The edge of the spacer definition layer 16 comprises a first step S1. The photo spacer PS is formed along the profile of the first step S1 on the spacer definition layer 16 adjacent to the first step S1, thereby forming a second step S2 on the photo spacer PS.

Accordingly, the spacer definition layer can be a light shield array or a color filter. The spacer definition layer also can be conductive line, such as M1, M2, and the likes, semiconductor, insulator layer or passivation. Further, the spacer definition layer can be a stacked structure of above-mentioned layers. Excepted, the substrate can be color filter substrate or TFT array substrate.

First Embodiment

Figure 7A:
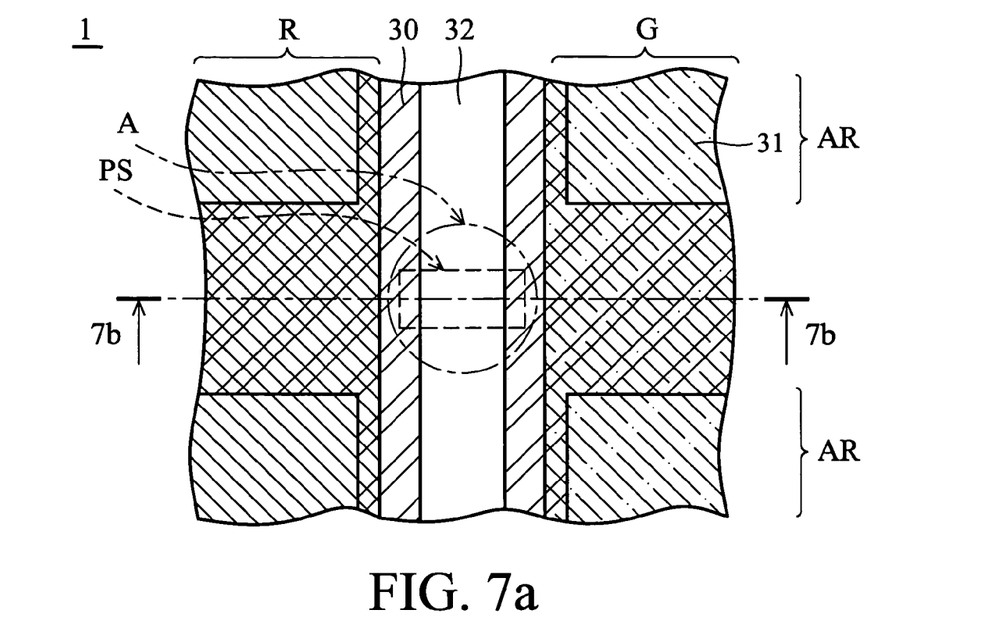
FIG. 7a is a top view illustrating a LCD substrate of the first embodiment of the invention.
Figure 7B:
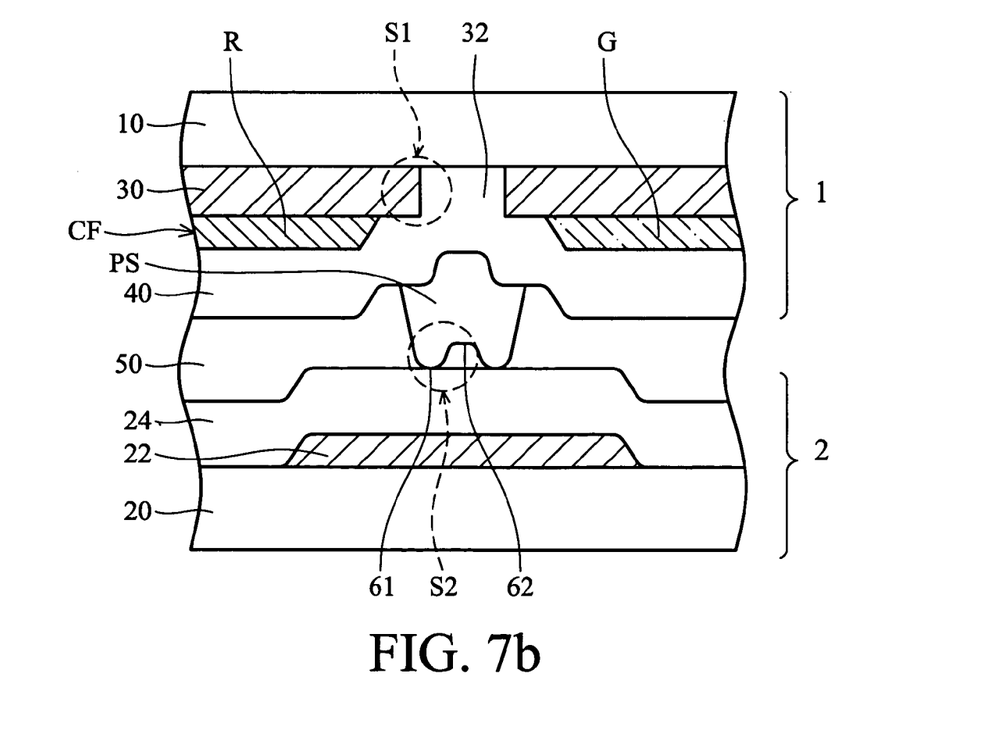

FIG. 7a is a partial top view illustrating a LCD substrate of a first illustrative embodiment of the invention, wherein the spacer definition layer is a light shield array. FIG. 7b is a cross section taken along line 7b-7b of FIG. 7a. In FIG. 7b, a liquid crystal display comprises a color filter substrate 1, a TFT array substrate 2, and a liquid crystal layer 50 interposed between the color filter substrate 1 and the TFT array substrate 2.

Referring to FIGS. 7a and 7b, the color filter substrate 1 comprises a first glass substrate 10, a light shield array 30, a plurality of color filters CF, a passivation layer 40, and a photo spacer PS. A fabrication method of the color filter substrate 1 comprises forming a light shield array 30 on the first glass substrate 10, wherein the light shield array comprises a first opening 31 and a second opening 32. The first opening 31 defines an active region AR. The second opening 32 defines a first step S1. The second opening, as shown in FIGS. 7a and 7b, is a slit. Sequentially, a plurality of color filters CF are formed on the active region AR of the first glass substrate 10. The color filters CF comprise strip-type red R, green G, and blue B color layers. Next, a passivation layer 40 is formed on the color filters CF and the light shield layer 30 along the profile of the color filters CF and the light shield layer 30.

A photo spacer layer (not shown) is formed on the passivation layer 40 such that the photo spacer layer creates a second step S2 along the profile of the first step S1. The thickness of the photo spacer layer is approximately 2.5-5 μm. Afterward, an exposure using a mask and at least one development step are sequentially performed to remove a portion of the photo spacer layer creating a photo spacer PS with a second step S2. The second step S2 comprises a protrusion 61 and a recess 62. And the TFT array substrate 2, depicted in FIG. 7b, comprises a second glass substrate 20, a metal line 22, and an insulating layer 24.

According to embodiments of the invention, the photo spacer PS with a second step S2 is formed on the light shield array 30 utilizing the profile of a second opening 32 with a first step. To prevent light leakage, a metal line 22, such as a signal line of a gate line or a data line, is formed on the TFT array substrate 2 corresponding to the second opening 32 of the light shield array 30.

Figure 8A:
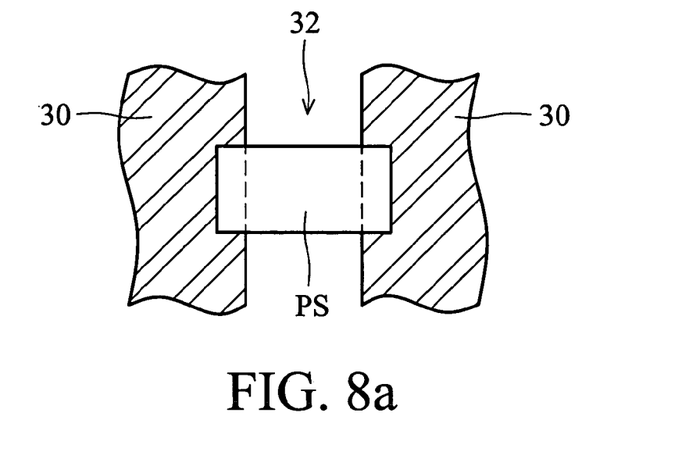
FIG. 8a is a partial top view of FIG. 7b illustrating an arrangement of the light shield array and spacer within the region A.

FIG. 8a is a partial top view of FIG. 7b illustrating an arrangement of the light shield array 30 and photo spacer PS within the region A. Referring to FIGS. 7b and 8a, after exposure and development, photo spacer PS is formed across the second opening 32 of the light shield array 30, thereby forming two second steps S2 on the photo spacer PS.

Figure 8B:
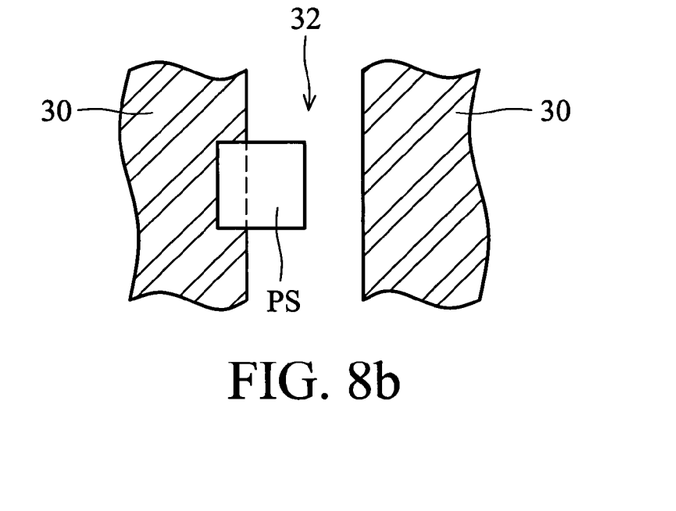
FIGS. 8b and 8c are partial top views illustrating an alternative illustrative embodiment of the invention.

FIGS. 8b and 8c are partial top views illustrating an alternative embodiment of the invention. Referring to FIG. 8b, light shield array 30 comprises a second opening 32 in the form of a slit. FIG. 8b is different form FIG. 8a in that the photo spacer PS is disposed adjacent to only one step S of the second opening 32 of the light shield array 30 instead of the other step S1, thereby forming a second step S2 on the photo spacer PS.

Figure 8C:
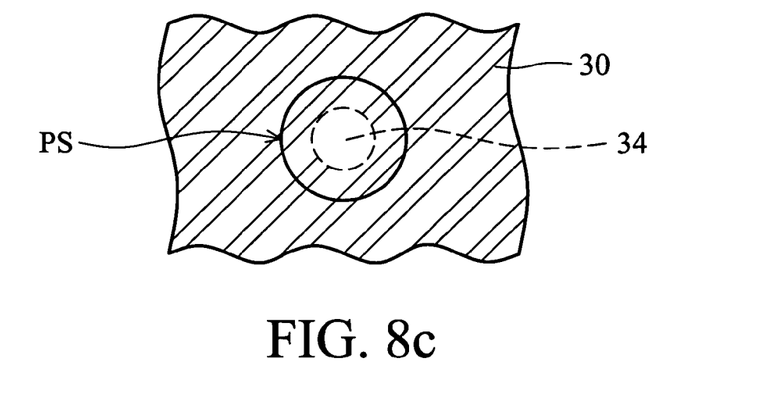

Referring to FIG. 8c, light shield array 30 comprises a second opening 32 in the form of a circular hole. After exposure and development, the photo spacer PS is formed covering the circular hole 34 of the light shield array 30, thereby forming two circular second steps (not shown) on the photo spacer PS.

The feature of this embodiment of the invention is that the photo spacer PS is formed on a structure with a step, thereby substantially forming a step on the photo spacer PS. For example, according to the first illustrative embodiment, photo spacer PS is formed on the light shield array with a first step S1, thereby substantially forming a second step S2 on the photo spacer PS along the first step S1 of the light shield array 30. Therefore, the invention requires only one photo mask step to from a photo spacer with a spacer and is simpler than the conventional half-tone masking step.

Accordingly, the height of the second step S2 of the photo spacer PS, such as the distance between protrusion 61 and recess 62 as shown in FIG. 7b, is preferably between approximately 0.05 and 0.3 μm. After assembling the color filter substrate 1 and the TFT array substrate 2, the protrusion 61 of the photo spacer PS normally contact the array substrate 2, while the recess 62 of the photo spacer PS does not contact the TFT array substrate 2. When a normal force is applied on the substrate, the protrusion 61 can be elastically deformed while the recess 62 can contact the TFT substrate. The entire density of the spacer increases such that more load can be sustained, thereby preventing push mura defects.

When a black matrix resin is introduced to the light shield array 30, the height of the first step S1 of the second opening 32 is approximately between 1.2-1.5 μm, because the thickness of the black matrix resin is approximately between 1.2-1.5 μm. After the passivation layer 40 is formed, the height of the second step S2 formed by the photo spacer layer is slightly less than that of the first step S1 but still cannot reach the desired range of 0.05-0.3 μm. If the second step S2 is too high, when a normal force applied, the recess 62 cannot contact the TFT substrate and the entire density of the spacer cannot effectively increase such that push mura defects cannot prevented. Accordingly, a step of reflow is performed to appropriately adjust the height of the second step S2 prior to exposure and development, thereby reducing the height of the second step S2 such as within the desired range of 0.05-0.3 μm.

Additionally, when chromium (Cr) is introduced, the height of the first step S1 of the second opening 32 is approximately between 0.2-0.3 μm, because the thickness of the chromium layer is approximately between 0.2-0.3 μm. After the passivation layer 40 is formed, the height of the second step S2 formed by the photo spacer layer can reach the desired range of 0.05-0.3 μm without requiring additional reflow.

Reflow, however, can also be performed to adjust the height of the second step S2 dependent on design requirements.

Second Embodiment

Figure 9A:
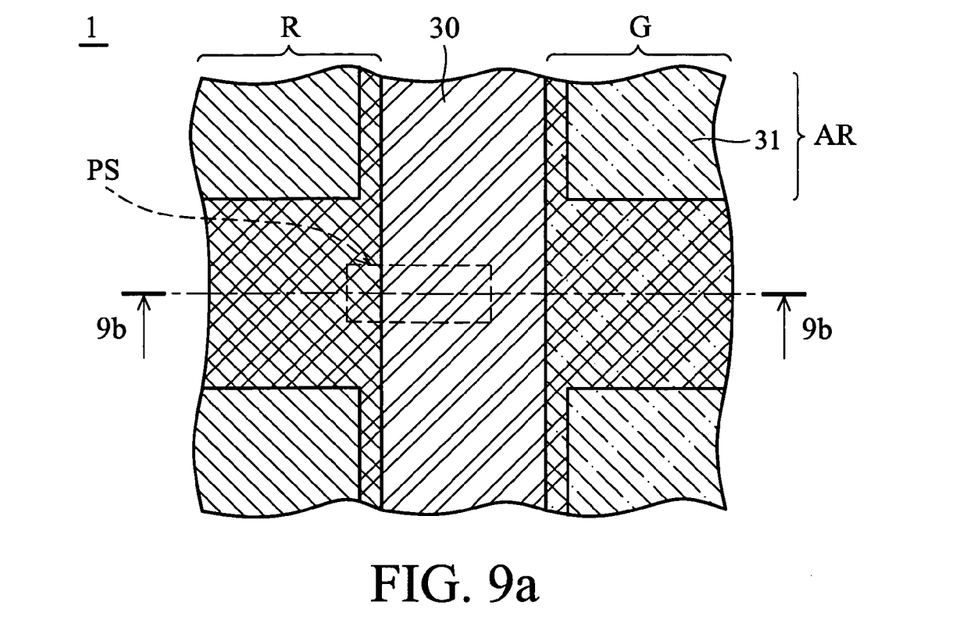
FIG. 9a is a top view illustrating a LCD substrate in which the spacer definition layer is a color filter layer in accordance with a second illustrative embodiment of the invention.
Figure 9B:
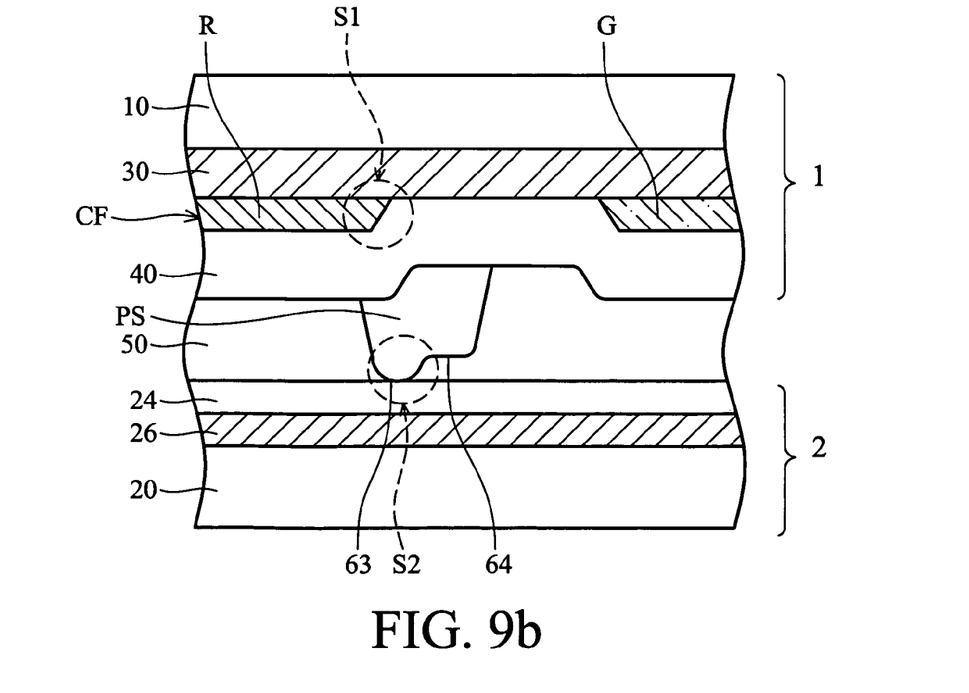

FIG. 9a is a partial top view illustrating a LCD substrate in which the spacer definition layer is a color filter layer in accordance with a second illustrative embodiment of the invention. FIG. 9b is a cross section taken along line 9b-9b in FIG. 9a. In FIG. 9b, a liquid crystal display comprises a color filter substrate 1, a TFT array substrate 2, and a liquid crystal layer 50 interposed between the color filter substrate 1 and the TFT array substrate 2.

Referring to FIGS. 9a and 9b, the color filter substrate 1 comprises a first glass substrate 10, a light shield array 30, a plurality of color filters CF, a passivation layer 40, and a photo spacer PS. A fabrication method of the color filter substrate 1 comprises forming a light shield array 30 having a first opening 31 on the first glass substrate 10, thereby defining an active region AR. A plurality of color filters CF are sequentially formed on the active region AR of the first glass substrate 10. The color filters CF comprise strip-type red R, green G, and blue B color layers. Next, a passivation layer 40 is formed on the color filters CF and the light shield layer 30 and along the profile of the color filter CF and the light shield layer 30.

A photo spacer layer (not shown) is formed on the passivation layer 40 such that the photo spacer layer creates a second step S2 along the profile of the first step S1. Afterward, an exposure using a mask and at least one development step are sequentially performed to remove a portion of the photo spacer layer creating a photo spacer PS with a second step S2. The second step S2 comprises a protrusion 63 and a recess 64. And the TFT array substrate 2, depicted in FIG. 9b, comprises a second glass substrate 20, a metal line 26, and an insulating layer 24.

In the second embodiment, the photo spacer PS is formed on the color filters CF with a first step S1, thereby forming a second step S2 on the photo spacer PS along the first step S1 of the color filters CF. Therefore, the invention requires only one lithographic process to form a photo spacer with a step.

Similarly, in the second embodiment, the height of the second step S2 of the photo spacer PS, i.e., the distance between protrusion 63 and recess 64, is preferably between approximately 0.05 and 0.3 µm. After assembling the color filter substrate 1 and the TFT array substrate 2, the protrusion 63 of the photo spacer PS normally contacts the TFT array substrate 2, while the recess 64 of the photo spacer PS does not contact the TFT array substrate 2. When a normal force is applied on the LCD substrate, the protrusion 63 can be elastically deformed while the recess 64 can contact the TFT substrate. The entire density of the spacer increases such that more load can be sustained, thereby preventing push mura defects.

Moreover, if the height of the second step S2 of photo spacer PS cannot reach the desired range simply using the profile of the first step S1 of the color filters and passivation layer 40, a step of reflow can be performed to appropriately adjust the height of the second step S2 prior to exposure and development.

Third Embodiment

Figure 10A:
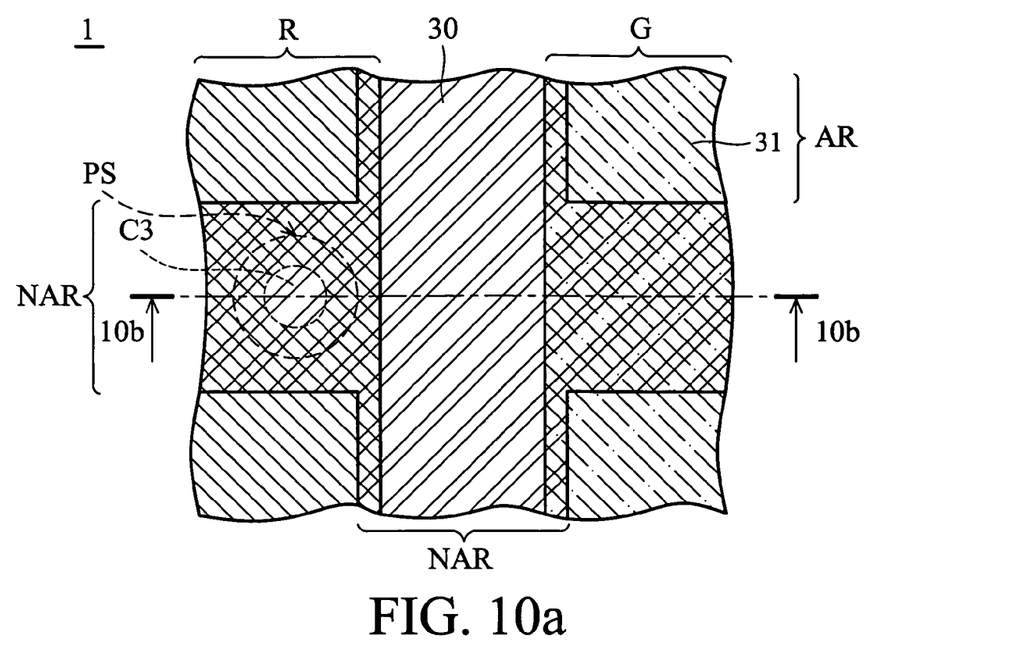
FIG. 10a is a top view illustrating a LCD substrate in which the spacer definition layer is a color filter layer in accordance with a third illustrative embodiment of the invention.
Figure 10B:
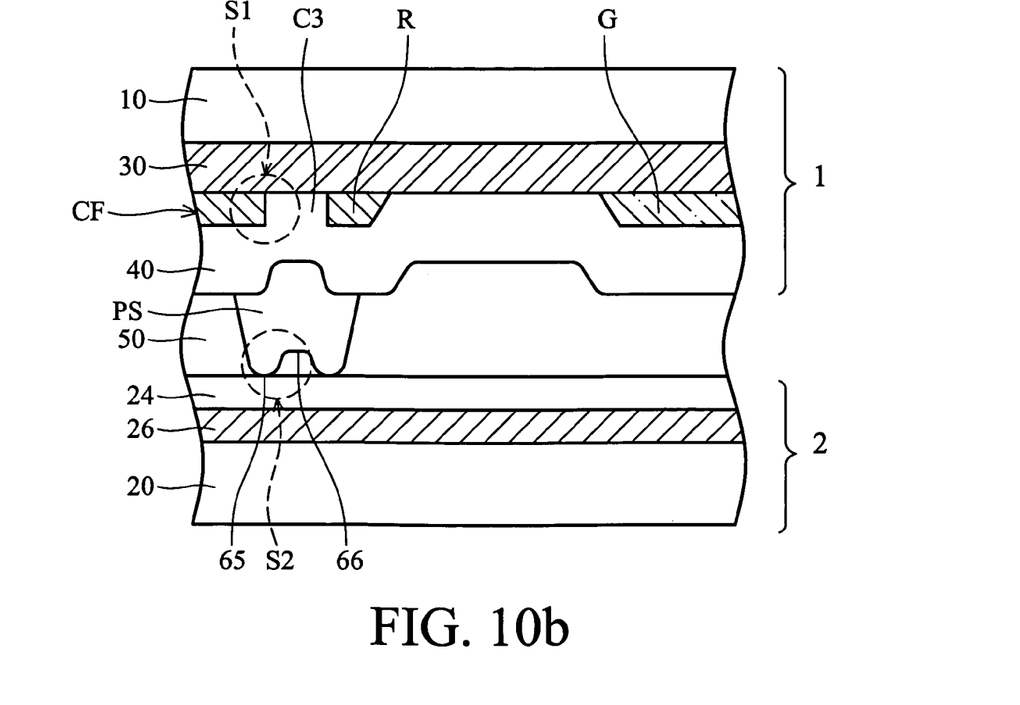

FIG. 10a is a partial top view illustrating a LCD substrate in which the spacer definition layer is a color filter layer in accordance with a third illustrative embodiment of the invention. FIG. 10b is a cross section taken along line 10b-10b in FIG. 10a. In FIG. 10b, a liquid crystal display comprises a color filter substrate 1, a TFT array substrate 2, and a liquid crystal layer 50 interposed between the color filter substrate 1 and the TFT array substrate 2.

Referring to FIGS. 10a and 10b, the color filter substrate 1 comprises a first glass substrate 10, a light shield array 30, a plurality of color filters CF, a passivation layer 40, and a photo spacer PS. A fabrication method of the color filter substrate 1 comprises forming a light shield array 30 having a first opening 31 on the first glass substrate 10, thereby defining an active region AR. Sequentially, a plurality of color filters CF are formed on the active region AR and non-active region NAR of the first glass substrate 10. A third opening C3 is formed within the color filters CF, thereby defining a first step S1. The color filters CF comprise strip-type red R, green G, and blue B color layers. Next, a passivation layer 40 is formed on the color filters CF and the light shield layer 30 and along the profile of the color filters CF and the light shield layer 30.

A photo spacer layer (not shown) is formed on the passivation layer 40 such that the photo spacer layer creates a second step S2 along the profile of the first step S1. Afterward, an exposure using a mask and at lease one development step are sequentially performed to remove a portion of the photo spacer layer creating a photo spacer PS with a second step S2. The second step S2 comprises a circular protrusion 65 and recess 66. And the TFT array substrate 2, depicted in FIG. 10b, comprises a second glass substrate 20, a metal line 26, and an insulating layer 24.

In the third embodiment, the photo spacer PS is formed on the color filters CF with a first step S1, thereby forming a second step S2 on the photo spacer PS along the first step S1 of the color filters CF. Therefore, the invention requires only one lithographic process to form a photo spacer with a step.

Similarly, in the third embodiment, the height of the second step S2 of the photo spacer PS, i.e., the distance between protrusion 65 and recess 66 as shown in FIG. 10b, is preferably between approximately 0.05 and 0.3 µm. After assembling the color filter substrate 1 and the TFT array substrate 2, the protrusion 65 of the photo spacer PS normally contact the array substrate 2, while the recess 66 of the photo spacer PS does not contact the TFT array substrate 2. When a normal force is applied on the substrate, the protrusion 65 can be elastically deformed while the recess 66 can contact the TFT substrate. The entire density of the spacer increases such that more load can be sustained, thereby preventing push mura defects.

Moreover, if the height of the second step S2 of photo spacer PS cannot reach the desired range simply using the profile of the first step S1 of the color filters and passivation layer 40, a step of reflow can be performed to appropriately adjust the height of the second step S2 prior to exposure and development.

Fourth Embodiment

Figure 11A:
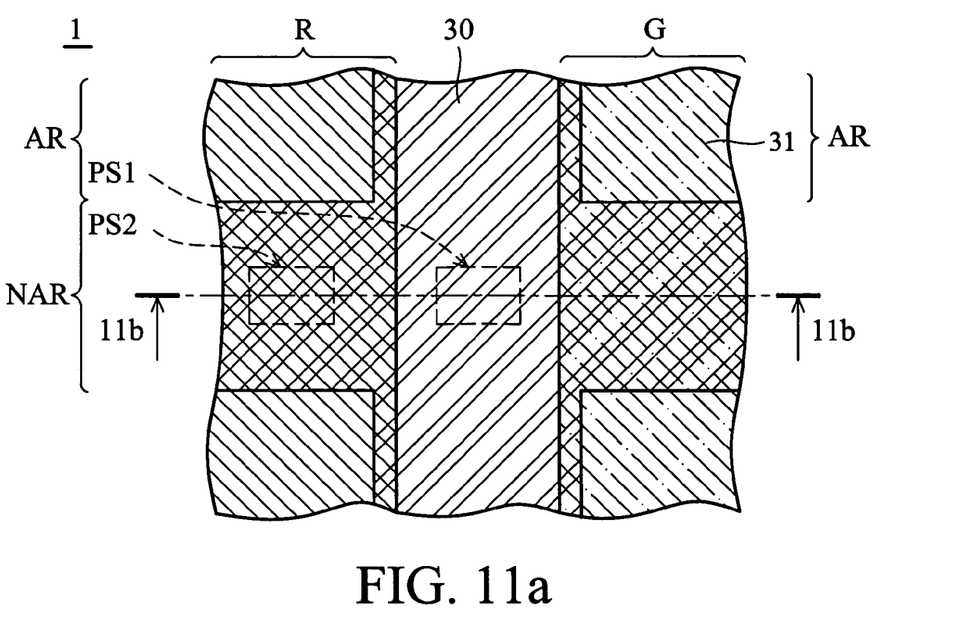
FIG. 11a is a top view illustrating a LCD substrate in accordance with a fourth illustrative embodiment of the invention.
Figure 11B:
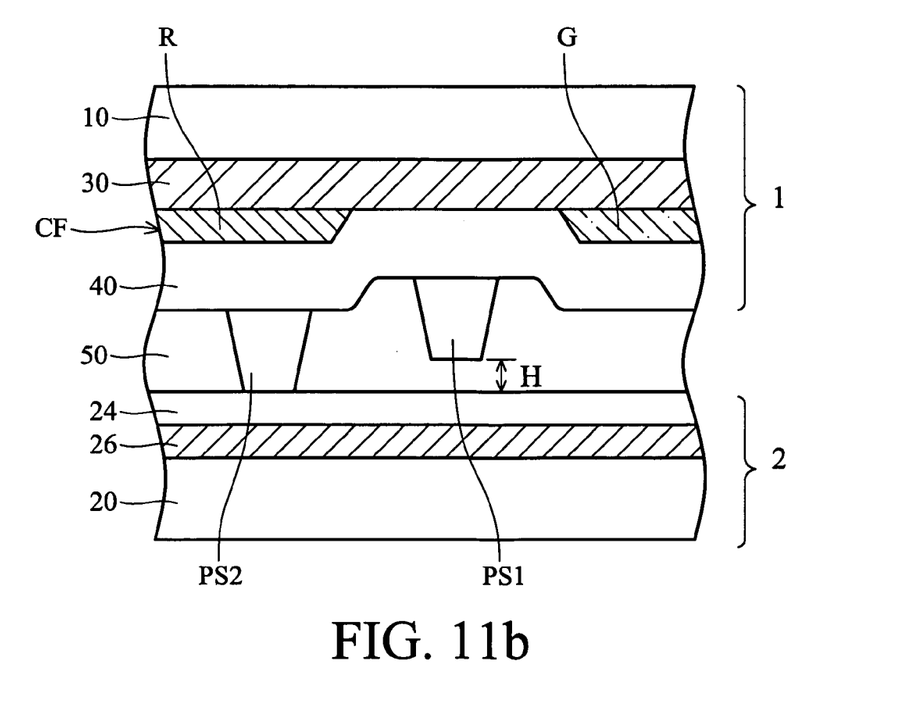

FIG. 11a is a partial top view illustrating a LCD substrate in accordance with a fourth illustrative embodiment of the invention. FIG. 11b is a cross section taken along line 11b-11b in FIG. 11a. In FIG. 11b, a liquid crystal display comprises a color filter substrate 1, a TFT array substrate 2, and a liquid crystal layer 50 interposed between the color filter substrate 1 and the TFT array substrate 2.

Referring to FIGS. 11a and 11b, the color filter substrate 1 comprises a first glass substrate 10, a light shield array 30, a color filter CF, a passivation layer 40, a first photo spacer PS1, and a second photo spacer PS2. Light shield array 30 having a first opening 31 is formed on the first glass substrate 10, thereby defining an active region AR. Sequentially, a plurality of color filters CF are formed on the active region AR and non-active region NAR of the first glass substrate 10. The color filters CF comprise strip-type red R, green G color, and blue B layers. Next, a passivation layer 40 is formed on the color filters CF and the light shield layer 30 along the profile of the color filters CF and the light shield layer 30.

A photo spacer layer (not shown) is formed on the passivation layer 40 such that the photo spacer layer creates a second step S2 along the profile of the first step S1. Afterward, an exposure using a mask and at least one development step are sequentially performed to remove a portion of the photo spacer layer creating a first photo spacer PS1 and second photo spacer PS2. And the TFT array substrate 2, depicted in FIG. 11b, comprises a second glass substrate 20, a metal line 26, and an insulating layer 24.

In the fourth illustrative embodiment, the first photo spacer PS1 is formed in the region without color filters CF, and the second photo spacer is formed in the non-active region NAR with color filters CF. The distance difference H between the first photo spacer PS1 and the second photo spacer PS2 is preferably between approximately 0.05 and 0.3 μm. After assembling the color filter substrate 1 and the TFT array substrate 2, the second photo spacer PS2 normally contact the array substrate 2, while the first photo spacer PS1 does not contact the TFT array substrate 2. When a normal force is applied on the substrate, the second photo spacer PS2 can be elastically deformed while the first photo spacer PS1 can contact the TFT substrate. The entire density of the spacer increases such that more load can be sustained, thereby preventing push mura defects.

Fifth Embodiment

Figure 12A:
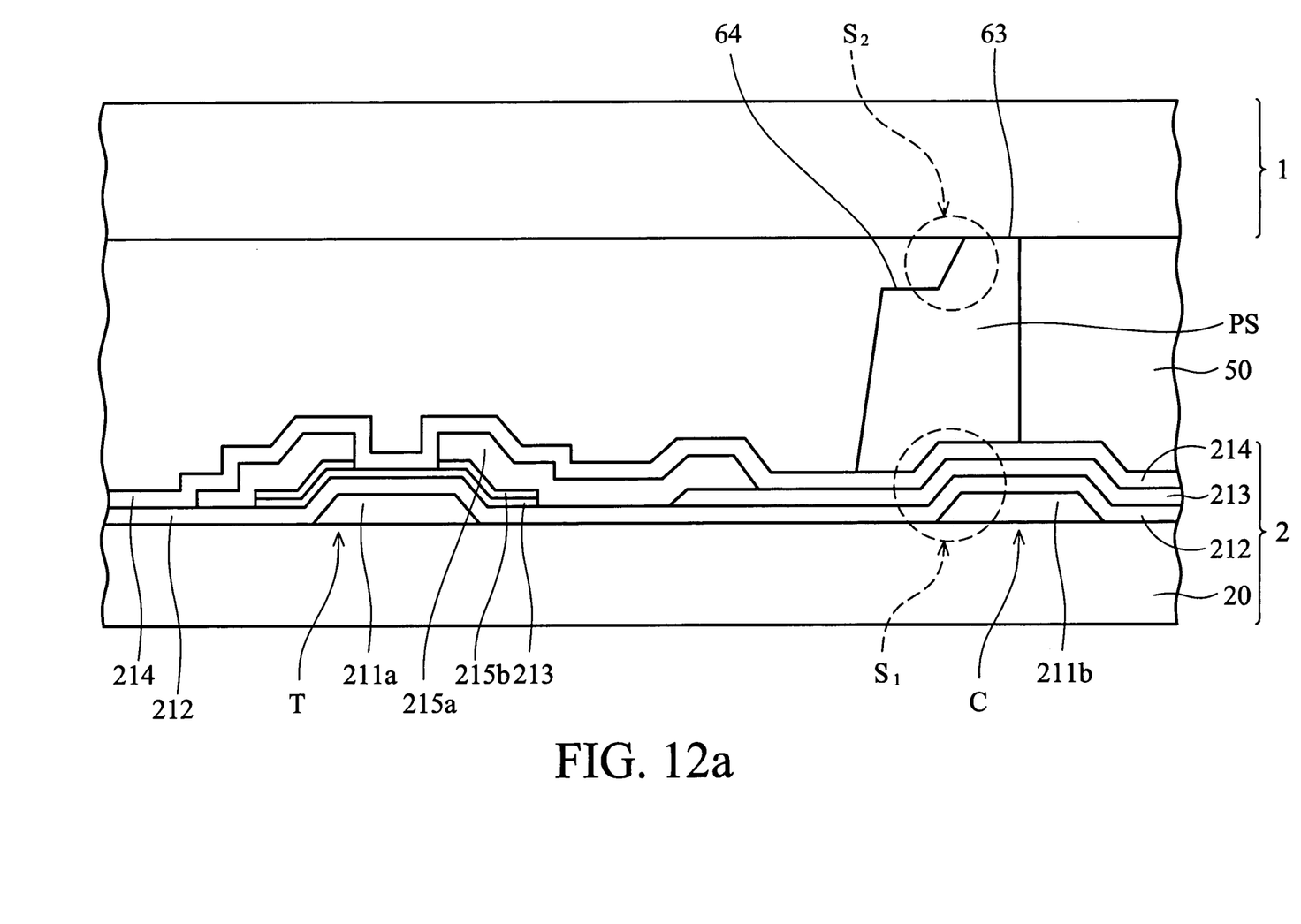
FIGS. 12a-12c are cross sections illustrating parts of a liquid crystal display in which the spacer definition layer comprises a capacitor, a TFT, or a metal line of illustrative embodiments of the invention.

FIG. 12a is a cross section illustrating a part of a liquid crystal display in which the spacer definition layer is a capacitor in accordance with a fifth illustrative embodiment of the invention. In FIG. 12a, a liquid crystal display comprises a color filter substrate 1, a TFT array substrate 2, and a liquid crystal layer 50 interposed between the color filter substrate 1 and the TFT array substrate 2.

Referring to FIG. 12a, the TFT array substrate 2 comprises a glass substrate 20, a thin film transistor T, a capacitor C, a passivation layer 214, and a photo spacer PS. The capacitor C comprises a first electrode 211b, a dielectric layer 212 and a second electrode 213, thereby defining a first step S1.

A photo spacer layer (not shown) is formed on the passivation layer 214 such that the photo spacer layer creates a second step S2 along the profile of the first step S1. Afterward, an exposure using a mask and at least one development step are sequentially performed to remove a portion of the photo spacer layer creating a photo spacer PS with a second step S2.

In the fifth embodiment, the photo spacer PS is formed on the TFT array substrate 2 with a first step S1, thereby forming a second step S2 on the photo spacer PS along the first step S1 of the capacitor C. Therefore, the invention requires only one lithographic process to form a photo spacer with a step.

Similarly, in the fifth embodiment, the height of the second step S2 of the photo spacer PS, i.e., the distance between protrusion 63 and recess 64 as shown in FIG. 12a, is preferably between approximately 0.05 and 0.3 μm. After assembling the color filter substrate 1 and the TFT array substrate 2, the protrusion 63 of the photo spacer PS normally contact the color filter substrate 1, while the recess 64 of the photo spacer PS does not contact the color filter substrate 1. When a normal force is applied on the substrate, the protrusion 63 can be elastically deformed while the recess 64 can contact the color filter substrate 1. The entire density of the spacer increases such that more load can be sustained, thereby preventing push mura defects.

Sixth Embodiment

Figure 12B:
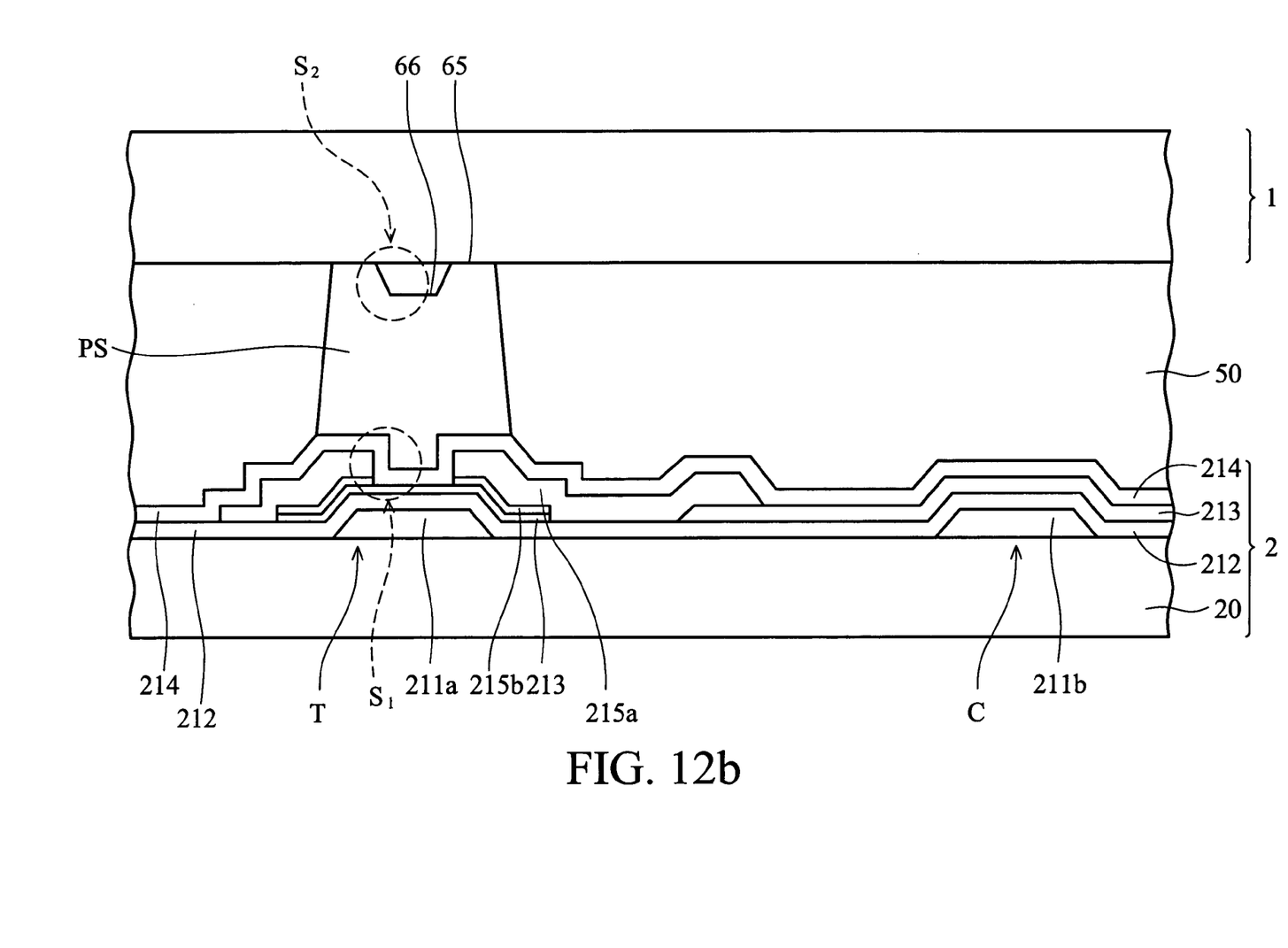

FIG. 12b is a cross section illustrating a part of a liquid crystal display in which the spacer definition layer is a thin film transistor in accordance with a sixth illustrative embodiment of the invention. In FIG. 12b, a liquid crystal display comprises a color filter substrate 1, a TFT array substrate 2, and a liquid crystal layer 50 interposed between the color filter substrate 1 and the TFT array substrate 2.

Referring to FIG. 12b, the TFT array substrate 2 comprises a glass substrate 20, a thin film transistor T, a capacitor C, a passivation layer 214, and a photo spacer PS. The thin film transistor T comprises a gate electrode 211a, a dielectric layer 212, a channel 213, and a source/drain 215a. An ohmic contact layer 215b is disposed between the channel 213, and the source/drain 215a. The passivation layer 214 covers the thin film transistor T. The edge of the ohmic contact layer 215b and the source/drain 215a defines a first step S1.

A photo spacer layer (not shown) is formed on the passivation layer 214 such that the photo spacer layer creates a second step S2 along the profile of the first step S1. Afterward, an exposure using a mask and at least one development step are sequentially performed to remove a portion of the photo spacer layer creating a photo spacer PS with a second step S2. The second step S2 comprises a circular protrusion 65 and recess 66.

In the sixth embodiment, the photo spacer PS is formed on the thin film transistor T with a first step S1, thereby forming a second step S2 on the photo spacer PS along the first step S of the thin film transistor T. Therefore, the invention requires only one lithographic process to form a photo spacer with a step.

Similarly, in the fifth embodiment, the height of the second step S2 of the photo spacer PS, i.e., the distance between protrusion 65 and recess 66 as shown in FIG. 12b, is preferably between approximately 0.05 and 0.3 μm. After assembling the color filter substrate 1 and the TFT array substrate 2, the protrusion 65 of the photo spacer PS normally contact the color filter substrate 1, while the recess 66 of the photo spacer PS does not contact the color filter substrate 1. When a normal force is applied on the substrate, the protrusion 65 can be elastically deformed while the recess 66 can contact the color filter substrate 1. The entire density of the spacer increases such that more load can be sustained, thereby preventing push mura defects.

Figure 12C:
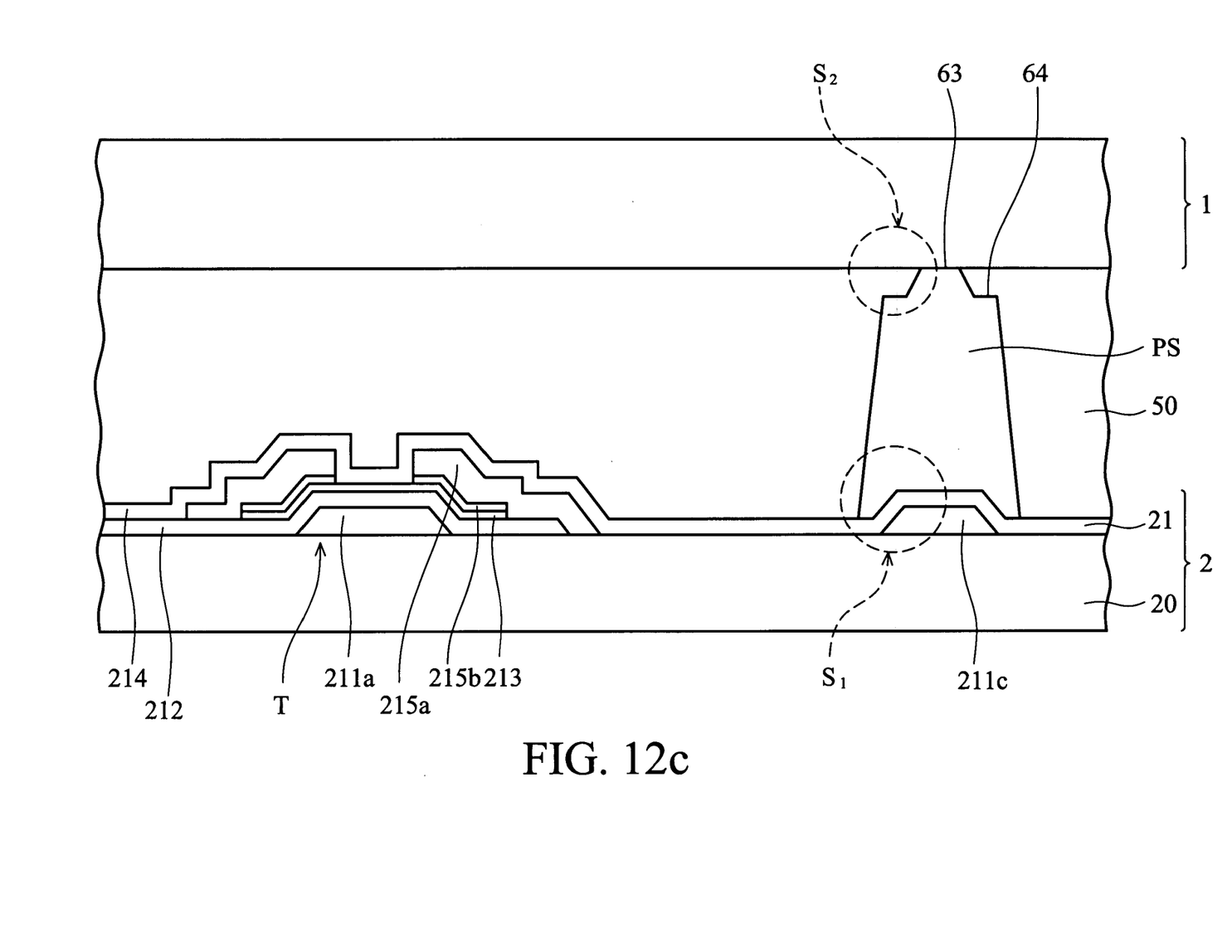

The spacer definition layer on the TFT array substrate is not limited to a capacitor C and a thin film transistor T. Other structures, such as metal lines 211c, providing a first step S1 can also act as the spacer definition layer, as shown in FIG. 12c.

Furthermore, a LCD structure of color filter on array (COA) could be also introduced into the foregoing invention. Accordingly, the invention improves on the related art in that the photo spacer PS is formed on the spacer definition layer, such as light shield array, color filter, conductive line, semiconductor, passivation or insulator layer with a first step, thereby substantially forming a second step on the photo spacer along the first step. Therefore, only one photo mask step is required to from a photo spacer with a step and is simpler than the conventional half-tone masking step. After assembling the color filter substrate and the TFT array substrate, the protrusion of the photo spacer normally contacts the opposite substrate, while the recess of the photo spacer does not contact the surface of the opposite substrate. When a normal force is applied on the substrate, the protrusion can be elastically deformed while the recess can contact the opposite substrate. The entire density of the spacer increases such that more load can be sustained, thereby preventing push mura defects.

Additionally, the invention also provides two photo spacers. One photo spacer is formed in the region without spacer definition layer, and the other photo spacer is formed in the non-active region with spacer definition layer. A height difference is between the first photo spacer and the second photo spacer. After assembling the color filter substrate and the TFT array substrate, the second photo spacer normally contacts the opposite substrate, while the first photo spacer does not contact the surface of the opposite substrate. When a normal force is applied on the substrate, the second photo spacer can be elastically deformed while the first photo spacer can contact the opposite substrate. The entire density of the spacer increases such that more load can be sustained, thereby preventing push mura defects.

While the invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A liquid crystal display (LCD) substrate comprising:
   a substrate;
   a black matrix layer formed on the substrate, and a first opening formed in the black matrix layer;
   a color filter formed on the black matrix layer, and a second opening formed in the color filter, wherein the first opening is positioned within the second opening and exposed by the second opening, and wherein the first opening defines a first step;
   a passivation layer disposed on the black matrix layer and the color filter, and formed along a profile of the first step, thereby forming a second step on the passivation layer; and
   at least one spacer formed on the passivation layer and along a profile of the second step of the passivation layer, thereby forming a third step on the spacer, wherein the spacer is positioned corresponding to the first opening and totally within the second opening.

2. The LCD substrate as claimed in claim 1, wherein the height of the third step is approximately between 0.05 and 0.3μm.

3. The LCD substrate as claimed in claim 1, wherein the third opening is a slit.

4. The LCD substrate as claimed in claim 1, wherein the third opening is a hole.

5. A liquid crystal display (LCD) substrate comprising:
   a substrate;
   a black matrix layer formed on the substrate;
   a color filter formed on the black matrix and having an opening to expose a portion of the black matrix layer;
   a passivation layer formed on the black matrix layer and the color filter layer; and
   a first spacer and a second spacer separately formed on the passivation layer;
   wherein the first spacer is totally formed in an overlap region of the black matrix layer and the color filter and outside the opening of the color filter, and the second spacer is formed totally within the opening; and
   wherein between the bottom of the first spacer and the bottom of the second spacer comprises a distance difference.

6. The LCD substrate as claimed in claim 5, wherein the distance difference is approximately between 0.05 and 0.3μm.

7. The LCD substrate as claimed in claim 5, wherein the distance difference is substantially equal to the thickness of the passivation layer.

8. The LCD substrate as claimed in claim 1, wherein the spacer is formed across the first opening to form two protrusions and a recess between the two protrusions, and wherein the width of the recess is less than that of the first opening.

9. A liquid crystal display (LCD) substrate comprising:
   a substrate;
   a black matrix layer formed on the substrate;
   a color filter formed on the black matrix and having at least red, green, and blue color layers, an opening formed totally within only one of the color layers and exposing a portion of the black matrix layer, wherein the opening defines a first step;
   a passivation layer disposed on the black matrix layer and the color filter layer, and formed along a profile of the first step, thereby forming a second step on the passivation layer; and
   at least one spacer formed on the passivation layer, thereby forming a third step on the spacer, wherein the spacer is positioned corresponding to the opening and totally within the only one of the color layers.

10. The LCD substrate as claimed in claim 9, wherein the spacer is formed across the opening to form two protrusions and a recess between the two protrusions, and wherein the width of the recess is less than that of the opening.

* * * * *